United States Patent [19]

Macholdt et al.

[11] Patent Number: 5,137,576
[45] Date of Patent: Aug. 11, 1992

[54] QUINACRIDONES HAVING SELECTIVELY ADJUSTED TRIBOELECTRIC EFFECTS

[75] Inventors: Hans-Tobias Macholdt, Darmstadt; Adolf Kroh, Selters; Alexander Sieber, Frankfurt am Main; Erwin Dietz, Kelkheim, all of Fed. Rep. of Germany

[73] Assignee: Hoechst Aktiengesellschaft, Frankfurt am Main, Fed. Rep. of Germany

[21] Appl. No.: 414,137

[22] Filed: Sep. 28, 1989

[30] Foreign Application Priority Data

Oct. 1, 1988 [DE] Fed. Rep. of Germany ....... 3833422

[51] Int. Cl.$^5$ .................. C09B 48/00; C09B 67/22; C09B 67/52
[52] U.S. Cl. .................... 106/495; 106/493; 106/494; 106/496; 106/497; 430/45; 430/47; 430/106; 430/109; 430/110; 430/115; 546/49; 546/56; 546/57; 546/103
[58] Field of Search .............. 106/495, 497, 496; 546/49, 56, 57, 103; 430/106, 109, 110, 115, 45, 47

[56] References Cited

U.S. PATENT DOCUMENTS

| | | | |
|---|---|---|---|
| 3,804,619 | 4/1974 | Mammino et al. | 430/45 |
| 3,909,259 | 9/1975 | Mammino et al. | 430/45 |
| 3,973,981 | 8/1976 | Miyatake et al. | 546/49 |
| 4,057,426 | 11/1977 | Mammino et al. | 430/45 |
| 4,197,404 | 4/1980 | Johnson | 546/49 |
| 4,310,357 | 1/1982 | Ehashi et al. | 106/495 |
| 4,317,682 | 3/1982 | Katsura et al. | 106/496 |
| 4,324,851 | 4/1982 | Lu et al. | 430/106 |
| 4,541,872 | 9/1985 | Jaffee | 546/49 |
| 4,777,105 | 10/1988 | Macholdt et al. | 430/109 |

FOREIGN PATENT DOCUMENTS 3106906 1/1982 Fed. Rep. of Germany .
3618214 12/1987 Fed. Rep. of Germany .
727664 4/1980 U.S.S.R. ................ 546/49

OTHER PUBLICATIONS

"Charging Effects of Organic Pigments in Electrophotographic Toners", Macholdt et al, Dyes and Pigments, 9 (1988) 119–127.

Primary Examiner—William R. Dixon, Jr.
Assistant Examiner—Scott L. Hertzog

[57] ABSTRACT

Quinacridones having selectively adjusted triboelectric effects, which quinacridones contain about 0.05% to 100 percent by weight of triboelectrically active compounds of the general formula I $$Q\text{---}[A\text{---}Y]_n \qquad (I),$$

in which Q is a quinacridone radical which is unsubstituted or substituted by halogen atoms, alkyl, alkoxy $H_2N\text{---}CO\text{---}$, alkyl$\text{---}NH\text{---}CO\text{---}$ or (alkyl)$_2$N$\text{---}CO$ groups, A is a direct bond or $\text{---}O\text{---}$, $\text{---}S\text{---}$, $\text{---}NR^1\text{---}$, $\text{---}CO\text{---}$, $\text{---}SO_2\text{---}$, $\text{---}CR^2R^3\text{---}$ or arylene and Y is an $\text{---}NR^4R^5$ group or a five-, six- or seven-membered heterocycle which contains one to three heteroatoms from the series comprising nitrogen and/or oxygen and/or sulfur and which can be substituted by alkyl, alkoxy, hydroxyphenyl, halogen, $\text{---}CN$, $\text{---}COOH$, $\text{---}CO\text{---}NRR'$, $\text{---}SO_2\text{---}NRR'$, hydroxyalkyl or alkylaminoalkyl, in which R and R' together with the nitrogen atom can be a heterocycle, R and R' are hydrogen atoms or alkyl and $R^1$ to $R^5$, independently of one another, are each hydrogen and/or alkyl or alkenyl of 1 to 22 carbon atoms and n is a number from 1 to 4, and their use for the preparation of toners or developers which are used for electrophotographic copying or reproduction of originals and for printing electronically, optionally or magnetically stored information or are used in color proofing.

11 Claims, No Drawings

QUINACRIDONES HAVING SELECTIVELY ADJUSTED TRIBOELECTRIC EFFECTS

The present invention relates to quinacridones, in particular quinacridones based on C.I. Pigment Red 122, C.I. Pigment Violet 19 and C.I. Pigment Red 209, and to quinacridones and quinacridone mixed crystals based on 2,9-dimethylquinacridone having selectively adjusted triboelectric effects and to their use as colorants in electrophotographic toners and developers.

In electrophotographic recording processes, a "latent charge image" is produced, for example, on a photoconductor drum. This is done, for example, by charging the photoconductor drum by means of a corona discharge and then subjecting the electrostatically charged surface of the photoconductor drum to imagewise exposure which leads to charge dissipation to the earthed substrate at the exposed areas. The "latent charge image" thus produced is then developed by applying a toner.

In a subsequent step, the toner is transferred from the photoconductor to, for example, paper, textiles, sheets or plastic and fixed there, for example, by pressure, radiation, heat or exposure to a solvent. The used photoconductor is then cleaned and again available for a new recording process.

In electrophotographic recording processes, in addition to the correct color shade of the toner (the toner is the component which contains the colorant and is the color donor in the recording process), its triboelectric chargeability is imperative, the sign and level of chargeability being of fundamental importance.

A measure for the toner quality is its specific chargeability Q/M (charge per mass unit). In addition to sign and level of the toner charge, in particular the charging profile as a function of the duration of activation is particularly suitable for describing exactly the triboelectric behavior of a toner or developer.

The color shade of toners for monochrome recordings is mainly determined by aesthetic aspects; for the multi-color reproduction by the principle of "subtractive color mixing", transparency and color site are decisive.

Based on the principle of "subtractive color mixing", it is possible to reproduce the entire color spectrum visible to the human eye by means of the three primary colors yellow, cyan and magenta. Only if the respective primary color meets the exactly defined coloristic requirements is an exact color reproduction possible. Otherwise, some hues cannot be reproduced and the color contrast is not sufficient.

In color toners for multi-color reproduction, the three toners yellow, cyan and magenta have to be exactly tuned to one another, not only with respect to the exactly defined coloristic requirements but also regarding their triboelectric properties. The triboelectric tuning is necessary since, in full-color printing or in full-color copies, the three color toners (or four if black is included) have to be successively transferred in the same apparatus. If the pigments yellow, cyan and magenta have different triboelectric effects on the toner chargeability, it is not possible to add them to a color-less toner basis recipe, once prepared, solely as colorants without substantially changing the triboelectric properties. Rather, it may then be necessary to develop an individual recipe for each colorant in which, for example, type and amount of the required charge-controlling agent and even including the carrier material have to be specifically adapted.

Accordingly, this process is complicated and adds to the difficulties already described in the case of color toners for process inks.

The suitability in principle of 2,9-dimethylquinacridone (C.I. Pigment Red 122) as magenta colorant for electrophotographic recording processes is described, for example, in U.S. Pat. Nos. 4,057,426, 3,804,619 and 3,909,259, according to which 2,9-dimethylquinacridone is highly suitable with respect to its shade and its transparency. However, with respect to the triboelectric chargeability of the toner, 2,9-dimethylquinacridone has certain shortcomings. Thus, for example, U.S. Pat. No. 4,057,426 describes the use of an expensive carrier consisting of polymer-coated steel particles, in which in turn a certain amount of copper tetra-4-(octadecylsulfonamido)phthalocyanine has to be present in the polymer, which is necessary to improve the chargeability of the toner.

The patent specification mentioned at the same time mentions once more that so far it has only been possible to use magenta toners (which contain 2,9-dimethylquinacridone as colorant) successfully in combination with a "nickelberry" carrier, (nickel particles having a specific knot-like surface) (U.S. Pat. Nos. 3,909,259 and 3,804,619), because flawless transfer of the toner could only be achieved by a special combination of carrier and toner.

Since no single carrier is available for the three toner colors, due to the use of a special nickel carrier for the magenta toner, their recording process becomes more complicated by one additional parameter, especially since the use of nickel by itself presents a problem due to its toxicological risk Moreover, the suitability of mixed crystals of quinacridones as magenta colorants for electrophotographic toners and developers is known. Thus, German Offenlegungsschrift 3,618,214 A1 which corresponds to U.S. Pat. No. 4,777,105 describes the use of mixed crystals composed of 95 to 60 parts of a compound of the formula (A) below and 5 to 40 parts of a compound of the formula (B) below

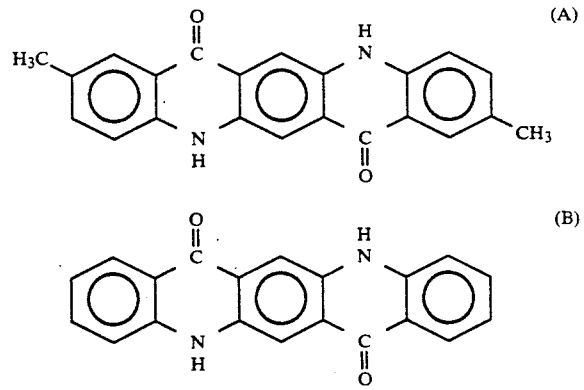

the mixed crystals described having a significantly higher negative triboelectric effect than pure 2,9-dimethylquinacridone.

All previously described quinacridone-based magenta pigments have in common that they have a very distinct effect on the triboelectric charging of toners and developers. It is true that this problem can in principle be solved by the addition of colorless charge-controlling agents, which adjust the toner charging desired in each case (U.S. Pat. No. 4,324,851, EP 0,161,128) which corresponds to U.S. Pat. No. 4,496,643; this can, however, lead to new difficulties.

In addition to the expense already mentioned above of having to develop an individual recipe for each toner color, in particular the compatibility of the charge-controlling agent with the remaining toner components, equal distribution in the toner and resistance to temperature and migration must be ensured. Furthermore, the addition of charge-controlling agents is a further process step involving corresponding costs.

It was therefore the object of the present invention to find quinacridone pigments, in particular quinacridone pigments of the color magenta, which have selectively adjusted triboelectric effects and in which the coloristic properties and fastness properties of the particular pigment had to remain unaffected and moreover the possibilities of influencing the coloristic and fastness properties of the pigment, which usually exist during the synthesis or the aftertreatment, must not be diminished.

It was in particular the object to be able to neutralize the particular pigment triboelectrically. "Triboelectrically neutral behavior" is understood to mean that the pigment, in the particular toner or developer, does not affect their chargeability. This in turn means that the adjustment of the triboelectric effect of a pigment must be possible in very small steps in order to adapt it in this manner optimally to the particular system. In addition to the use in electrophotographic toners and developers, influencing the triboelectric effect of pigments is also of interest for their use in electrokinetically sprayed powders and paints, since pigments can also have a determining effect on the chargeability of powders (German Offenlegungsschrift 3,737,495 which corresponds to U.S. Ser. No. 07/266,509).

Surprisingly, it has now been found that the triboelectric effect of quinacridone pigments can be adjusted selectively by adding to these pigments certain, triboelectrically active compounds of the general formula I $$Q\text{--}[A\text{--}Y]_n \qquad (I),$$

individually or in a combination, in which Q in formula I is a quinacridone radical which is unsubstituted or substituted by halogen atoms, such as, for example, fluorine or chlorine atoms, alkyl($C_1$-$C_6$), alkoxy($C_1$-$C_6$), $H_2N$—CO—, alkyl($C_1$-$C_8$)—NH—CO— or

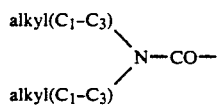

groups, A is a direct bond or a bridge member from the series comprising —O—, —S—, —$NR^1$—, —CO—, —$SO_2$—, —$CR^2R^3$—, arylene, for example phenylene, and chemically reasonable combinations of these bridge members, and Y is an —$NR^4R^5$ group or a five-, six- or seven-membered heterocycle which contains one to three heteroatoms from the series comprising nitrogen and/or oxygen and/or sulfur and which can be substituted by alkyl($C_1$-$C_4$), alkoxy($C_1$-$C_6$), hydroxyphenyl, halogen, for example a fluorine, chlorine or bromine atom, —CN, carboxyl, —CO—NRR', —$SO_2$—NRR', saturated or unsaturated hydroxyalkyl or alkylaminoalkyl, in which R and R' together with the nitrogen atom can be an aliphatic or aromatic heterocycle, R and R' are hydrogen atoms or alkyl($C_1$-$C_4$) groups and $R^1$ to $R^5$, independently of one another, are each a hydrogen atom and/or an alkyl or alkenyl group of 1 to 22 carbon atoms and n is a number from 1 to 4. In the adjusted quinacridone pigment, the triboelectrically active compound is advantageously present in an amount of about 0.05 to about 30 percent by weight. However, it can also be present at a higher percentage, the limit being 100%, i.e. without a separate pigment.

Preferred triboelectrically active compounds of the abovementioned general formula I are those in which Q is a quinacridone radical which is unsubstituted or substituted by alkyl($C_1$-$C_6$) groups or chlorine atoms, A is —$CH_2$—, —$NR^6$—, —$SO_2$—, —CO—, —$CR^7R^8$— or chemically reasonable combinations thereof, and Y is an —$NR^9R^{10}$ group or a five, six- or seven-membered nitrogen-containing heterocycle, in which $R^6$ to $R^{10}$ are alkyl groups of 1 to 6 carbon atoms and n is a number from 1 to 4.

Particularly preferred triboelectrically active compounds of the abovementioned general formula I are those in which Q is a quinacridone radical which is unsubstituted or substituted by alkyl($C_1$-$C_6$) groups or chlorine atoms, A is the grouping —$CH_2$—NH—CO—$CH_2$— and Y is an —$NR^{11}R^{12}$ group, in which $R^{11}$ and $R^{12}$ are an alkyl($C_1$-$C_6$) group, and n is a number from 1 to 4 and furthermore those in which Q is quinacridone radical which is unsubstituted or substituted by alkyl($C_1$-$C_6$) groups or chlorine atoms, A is a grouping of the formula —$SO_2$—NH—$(CH_2)_x$— or —CO—NH—$(CH_2)_x$—, in which x is a number from 1 to 22, and Y is an —$NR^{13}R^{14}$ group, in which $R^{13}$ and $R^{14}$ are an alkyl($C_1$-$C_6$) group, and n is a number from 1 to 4, and furthermore those in which Q is a quinacridone radical which is unsubstituted or substituted by alkyl($C_1$-$C_6$) groups or chlorine atoms, A is the group —$CH_2$—, Y is a five-, six- or seven-membered nitrogen-containing heterocycle and n is a number from 1 to 4.

Finally, further suitable triboelectrically particularly active compounds are those of the formulae $$Q\text{--}[SO_2\text{--}NH\text{--}CH_2\text{--}CH_2\text{--}N(C_2H_5)_2]_{1\text{-}2}$$

and

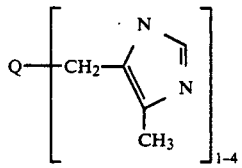

in which Q is in each case an unsubstituted quinacridone radical.

The quinacridone pigments can be substituted or unsubstituted quinacridones, such as, for example, C.I. Pigment Red 122 and 209 or C.I. Pigment Violet 19, and mixed crystal pigments, for example based on 2,9-dimethylquinacridone/quinacridone, such as described in German Offenlegungsschrift 3,618,214 A1. The triboelectrically selectively influenced pigments claimed according to the invention contain the triboelectrically active compounds typically in a concentration between about 0.05 and about 30 percent by weight, preferably 1 to 10 percent by weight, it being possible for the compound (additive) to be added to the pigment, for example, during its aftertreatment.

It is in principle known to add compounds based on quinacridones to quinacridone pigments. Thus, for example, DE 3,106,906 A1 which corresponds to U.S. Pat. No. 4,310,359 describes that by adding this type of compound to the pigments the dispersion stability of offset and other printing inks is increased.

However, the novel and completely surprising fact is that by adding the special, triboelectrically active compounds based on quinacridones to the pigments, the triboelectric effect of quinacridone pigments in toners and developers can be selectively adjusted (tailored). Thus, it is, for example, possible to vary the triboelectric effect of the pigments in very small steps by varying the concentration of the additive. For example, a test toner which contains 5% of a 2,9-dimethylquinacridone and no triboelectrically active additive (Example 4) shows a charge of $-12$ $\mu$C/g (activation time 30 minutes) and $-23$ $\mu$C/g (activation time 2 hours) and $-31$ $\mu$C/g (activation time 24 hours). A comparable toner containing 5% of triboelectrically active compound in the pigment (Example 2) shows a charge of $-9$ $\mu$C/g (activation time 30 minutes) and $-20$ $\mu$C/g (activation time 2 hours) and $-21$ $\mu$C/g (activation time 24 hours). If the pigment contains 10% of the triboelectrically active compound (Example 1), the charge is $-3$ $\mu$C/g (activation time 30 minutes) and $-3$ $\mu$C/g (activation time 2 hours) and $-2$ $\mu$C/g (activatation time 24 hours). Moreover, it is, however, also possible to use the triboelectrically active compounds individually (cf. Example 13) or in combination (cf. Example 12) with colorants, preferably magenta colorants, in particular with quinacridone pigments, as charge-controlling agents in electrophotographic toners and developers.

The triboelectrically selectively influenced pigments are usually incorporated homogeneously in a concentration between about 0.5 and about 15%, preferably about 3 to about 8%, in the particular support material, examples of typical support materials in the case of electrophotographic toners and developers being styrene, styrene/acrylate, styrene/butadiene, polyester and epoxy resins, and in the case of electrokinetically sprayed powders epoxy, polyester and acrylic resins individually or in combination, it being possible, if desired, for further components, such as, for example, waxes, charge-controlling agents, special curing components or pigments to be present in or to be added to the support materials after the pigment incorporation.

The triboelectrically selectively influenced pigments according to the invention are incorporated homogeneously into the support material in a manner known per se, for example by mixing and extruding or kneading. The pigments can be added either as dried and milled powder or as a dispersion or as a presscake or as a master batch or in some other suitable form. Likewise, it is in principle also possible to add the pigments as early as during the preparation of the particular support materials (resins), i.e. over the course of the polymerization or polycondensation.

The level of electrostatic charge of the electrophotographic toners in which the triboelectrically selectively influenced pigments were incorporated homogeneously according to the invention was measured in standard systems under identical conditions (such as identical dispersing times, identical particle size distribution, identical particle form) at 23° C. and 50% relative humidity. The activation of toner in a two-component developer is carried out by tumbling the toner together with a carrier (3 parts of toner for 97 parts of carrier) on a roll mill (150 revolutions per minute).

The determination of the Q/M value is greatly affected by the particle size. Therefore, the utmost care was taken to ensure that the toner samples obtained in the siftings and listed in the examples below were uniform with respect to the particle size distribution. The average particle size was 10 $\mu$m.

The preparation of each of the quinacridone pigments can be carried out by known processes.

The preparation of the triboelectrically active additive (designated below as "additive 1") used according to the various examples (see below) of the formula

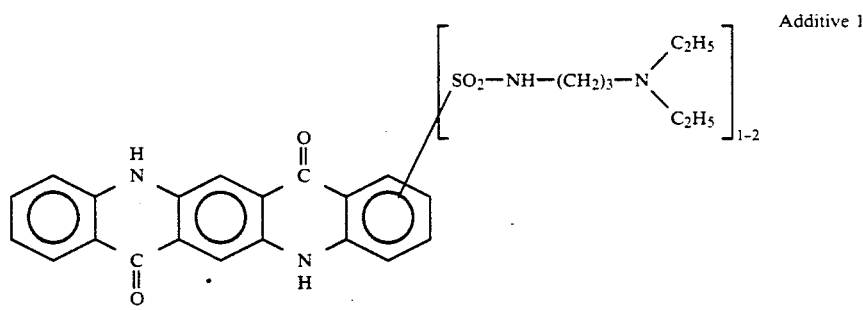

Additive 1 is carried out in a manner known per se (German Offenlegungsschrift 3,106,906) by sulfochlorination of the unsubstituted quinacridone with thionyl chloride in chlorosulfonic acid and subsequent condensation of the sulfochlorinated product with the corresponding amine.

The preparation of the triboelectrically active additive used in the examples below (designated below as "Additive 2") of the formula

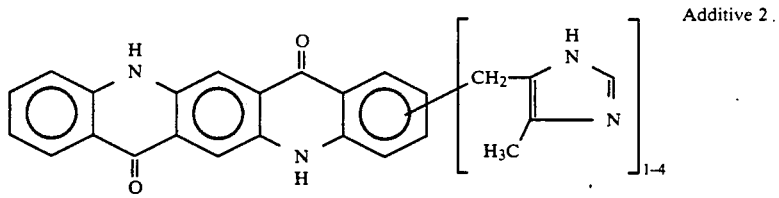

Additive 2.

is described in German Offenlegungsschrift 3,743,619 which corresponds to U.S. Pat. No. 4,986,852, Example 10.

The addition of the special triboelectrically active compounds can take place in different ways, for example during any desired synthesis step when the pigment is prepared, such as, for example, during the finishing (aftertreatment) of the pigment, it being possible to carry out a finishing with or without the use of solvents and with or without exposure of the pigment to shearing stress. Another possible addition comprises in mixing the compounds with the pigment presscake or pigment powder or in adding the pigment on the one hand, and the triboelectrically active compounds, individually or in combination, described according to the invention on the other hand, during the preparation of the toner or developer.

The examples below serve to illustrate the invention without limiting it thereto. The parts given are by weight. The compounds were added to the pigment during its finishing, as described in Patent Application P 38 33 423.2 which corresponds to U.S. patent application Ser. No. 07/414,754.

EXAMPLE 1

5 parts of C.I. Pigment Red 122 (2,9-dimethylquinacridone) (®Hostaperm-Rosa E), to which 10% of additive 1 were added during the finishing, were dispersed by means of a kneader from Werner & Pfleiderer (Stuttgart) in 95 parts of toner binder (®Dialec S 309 from Diamond Shamrock (styrene/methacrylic copolymer)) for 60 minutes. The mixture was then milled on a laboratory universal mill 100 LU (from Alpine, Augsburg) and then classified on a centrifugal sifter 100 MZR (from Alpine).

The desired particle fraction was activated by means of a carrier consisting of magnetite particles 50 to 200 $\mu$m in size of the type "90 $\mu$m Xerographic carrier" from Plasma Materials Inc., which had been coated with a styrene/methacrylic copolymer 90:10.

The measurement is carried out in a conventional Q/M measuring instrument (see J. H. Dessauer, H. E. Clark "Xerography and related Processes", Focal Press, N.Y. 1965, page 289); by using a sieve having a mesh width of 25 $\mu$m (508 mesh per inch) from Gebrüder Kufferath, Düren, it was ensured that no carrier can be entrained in the toner blowoffs.

Depending on the activation time, the following Q/M values [$\mu$C/g] were determined:

| Activation time | [$\mu$C/g] |
| --- | --- |
| 30 minutes | −3 |
| 2 hours | −3 |
| 24 hours | −2 |

EXAMPLE 2

5 parts of the pigment described in Example 1, to which only 5% of additive 1 were added during the finishing instead of 10%, were homogeneously incorporated in a toner, as described in Example 1. Depending on the activation time, the following Q/M values [$\mu$C/g] were measured:

| Activation time | [$\mu$C/g] |
| --- | --- |
| 30 minutes | −9 |
| 2 hours | −20 |
| 24 hours | −21 |

EXAMPLE 3

5 parts of the C.I. Pigment Red 122 described in Example 5, to which only 5% of additive 2 were added during the finishing were homogeneously incorporated in a toner, as described in Example 1. Depending on the activation time, the following Q/M values [$\mu$C/g] were measured:

| Activation title | [$\mu$C/g] |
| --- | --- |
| 30 minutes | −11 |
| 2 hours | −18 |
| 24 hours | −25 |

EXAMPLE 4 (COMPARATIVE EXAMPLE)

5 parts of the C.I. Pigment Red 122 (®Hostaperm-Rosa E) (2,9-dimethylquinacridone), without addition of additive 1 or 2 were homogeneously incorporated in a toner, as described in Example 1. Depending on the activation time, the following Q/M values [$\mu$C/g] were measured:

| Activation time | [$\mu$C/g] |
| --- | --- |
| 30 minutes | −12 |
| 2 hours | −23 |
| 24 hours | −31 |

EXAMPLE 5 (COMPARATIVE EXAMPLE)

5 parts of a mixed crystal based on 2,9-dimethylquinacridone (®Hostaperm-Rosa E 02) to which 10% of additive 1 were added during the finishing were homogeneously incorporated in a toner, as described in Example 1. Depending on the activation time, the following Q/M values [$\mu$C/g] were measured:

| Activation time | [$\mu$C/g] |
| --- | --- |
| 30 minutes | −5 |
| 2 hours | −4 |

-continued

| Activation time | [μC/g] |
| --- | --- |
| 24 hours | −2 |

EXAMPLE 6

5 parts of the pigment described in Example 5, to which only 2% of additive 1 were added during the finishing instead of 10%, were homogeneously incorporated in a toner, as described in Example 1. Depending on the activation time, the following Q/M values [μC/g] were measured:

| Activation time | [μC/g] |
| --- | --- |
| 30 minutes | −8 |
| 2 hours | −9 |
| 24 hours | −11 |

EXAMPLE 7 (COMPARATIVE EXAMPLE)

5 parts of a mixed crystal based on 2,9-dimethylquinacridone (®Hostaperm-Rosa E 02) described in Example 5, without addition of additive 1, were homogeneously incorporated in a toner, as described in Example 1. Depending on the activation time, the following Q/M values [μC/g] were measured:

| Activation time | [μC/g] |
| --- | --- |
| 30 minutes | −21 |
| 2 hours | −29 |
| 24 hours | −38 |

EXAMPLE 8

5 parts of C.I. Pigment Violet 19 (Hostaperm-Red E5B 02) (quinacridone) to which 5% of additive 1 were added at the end of the finishing were homogeneously incorporated in a toner, as described in Example 1. Depending on the activation time, the following Q/M values [μC/g] were measured:

| Activation time | [μC/g] |
| --- | --- |
| 30 minutes | −12 |
| 2 hours | −20 |
| 24 hours | −25 |

EXAMPLE 9 (COMPARATIVE EXAMPLE)

5 parts of C.I. Pigment Violet 19 (®Hostaperm-Red E5B 02) (quinacridone) without addition of additive 1 were homogeneously incorporated in a toner, as described in Example 1. Depending on the activation time, the following Q/M values [μC/g] were measured:

| Activation time | [μC/g] |
| --- | --- |
| 30 minutes | −15 |
| 2 hours | −23 |
| 24 hours | −27 |

EXAMPLE 10

5 parts of the C.I. Pigment Red 209 (®Hostaperm-Red EG) (dichloroquinacridone) to which 5% of additive 1 were added during the finishing, were homogeneously incorporated in a toner, as described in Example 1. Depending on the activation time, the following Q/M values [μC/g] were measured:

| Activation time | [μC/g] |
| --- | --- |
| 30 minutes | −15 |
| 2 hours | −21 |
| 24 hours | −22 |

EXAMPLE 11 (COMPARATIVE EXAMPLE)

5 parts of the C.I. Pigment Red 209 (®Hostaperm-Red EG) (dichloroquinacridone), without addition of additive 1 were homogeneously incorporated in a toner, as described in Example 1. Depending on the activation time, the following Q/M values [μC/g] were measured:

| Activation time | [μC/g] |
| --- | --- |
| 30 minutes | −16 |
| 2 hours | −22 |
| 24 hours | −24 |

EXAMPLE 12

5 parts of the pigment described in Example 4, and 1 part of additive 1 were homogeneously incorporated in a toner, as described in Example 1. Depending on the activation time, the following Q/M values [μC/g] were measured:

| Activation time | [μC/g] |
| --- | --- |
| 30 minutes | −7 |
| 2 hours | −11 |
| 24 hours | −13 |

EXAMPLE 13

1 part of additive 1 was homogeneously incorporated in a toner, as described in Example 1. Depending on the activation time, the following Q/M values [μC/g] were measured:

| Activation time | [μC/g] |
| --- | --- |
| 30 minutes | +1 |
| 2 hours | −6 |
| 24 hours | −13 |

We claim:

1. A quinacridone having selectively adjusted triboelectric effects which quinacridone contains about 0.05% to 100 percent by weight of triboelectrically active compounds of the general formula I $$Q + A - Y]_n \quad (I),$$

individually or in combination, in which Q in formula I is a quinacridone radical which is unsubstituted or substituted by halogen atoms, alkyl($C_1$-$C_6$), alkoxy($C_1$-$C_6$), $H_2N$—CO—, alkyl($C_1$-$C_8$)—NH—CO— or

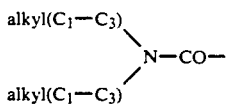

groups, A is a direct bond or a bridge member from the series comprising —O—, —S—, —NR$^1$—, —CO—, —SO$_2$—, —CR$^2$R$^3$—, arylene or chemically reasonable combinations of these bridge members, and Y is an —NR$^4$R$^5$ group or a five-, six- or seven-membered heterocycle which contains one to three heteroatoms from the series comprising nitrogen and/or oxygen and/or sulfur and which can be substituted by alkyl(C$_1$-C$_4$), alkoxy(C$_1$-C$_6$), hydroxyphenyl, halogen, —CN, —COOH, —CO—NRR', —SO$_2$—NRR', hydroxyalkyl or alkylaminoalkyl, in which R and R' together with the nitrogen atom can be an aliphatic or aromatic heterocycle, R and R' are hydrogen atoms or alkyl(C$_1$-C$_4$) groups and R$^1$ to R$^5$, independently of one another, are each a hydrogen atom and/or an alkyl or alkenyl group of 1 to 22 carbon atoms and n is a number from 1 to 4.

2. A quinacridone pigment having selectively adjusted triboelectric effects, which quinacridone contains about 0.05% to about 30 percent by weight of triboelectrically active compounds of the general formula I $$Q\text{---}[A\text{---}y]_n \qquad (I),$$

individually or in a combination, in which Q in formula I is a quinacridone radical which is unsubstituted or substituted by halogen atoms, alkyl(C$_1$-C$_5$), alkoxy(C$_1$-C$_6$), H$_2$N—CO—, alkyl(C$_1$-C$_8$)—NH—CO— or

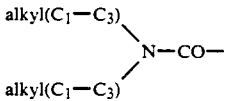

groups, A is a direct bond or a bridge member from the series comprising —O—, —S—, —NR$^1$—, —CO—, —SO$_2$—, —CR$^2$R$^3$—, arylene or chemically reasonable combinations of these bridge members, and Y is an —NR$^4$R$^5$ group or a five-, six- or seven-membered heterocycle which contains one to three heteroatoms from the series comprising nitrogen and/or oxygen and/or sulfur and which can be substituted by alkyl(C$_1$-C$_4$), alkoxy(C$_1$-C$_6$), hydroxyphenyl, halogen, —CN, —COOH, —CO—NRR', —SO$_2$—NRR', hydroxyalkyl or alkylaminoalkyl, in which R and R' together with the nitrogen atom can be an aliphatic or aromatic heterocycle, R and R' are hydrogen atoms or alkyl(C$_1$-C$_4$) groups and R$^1$ to R$^5$, independently of one another, are each a hydrogen atom and/or an alkyl or alkenyl group of 1 to 22 carbon atoms and n is a number from 1 to 4.

3. A quinacridone having selectively adjusted triboelectric effects as claimed in claim 1, wherein Q, in the general formula (I) mentioned there, is a quinacridone radical which is unsubstituted or substituted by alkyl(C$_1$-C$_6$) groups or chlorine atoms, A is —CH$_2$—, —NR$^6$—, —SO$_2$—, —CO—, —CR$^7$R$^8$ or chemically reasonable combinations, Y is an —NR$^9$R$^{10}$ group or a five-, six- or seven-membered nitrogen-containing heterocycle, in which R$^5$ to R$^{10}$ are alkyl groups of 1 to 6 carbon atoms, and n is a number from 1 to 4.

4. A quinacridone having selectively adjusted triboelectric effects as claimed in claim 1, wherein Q, in the general formula (I) mentioned there, is a quinacridone radical which is unsubstituted or substituted by alkyl(C$_1$-C$_6$) groups or chlorine atoms, A is the grouping —CH$_2$—NH—CO— CH$_2$— and Y is the group —NR$^{11}$R$^{12}$, in which R$^{11}$ and R$^{12}$ are alkyl groups of 1 to 6 carbon atoms, and n is a number from 1 to 4.

5. A quinacridone having selectively adjusted triboelectric effects as claimed in claim 1, wherein Q, in the general formula (I) mentioned there, is a quinacridone radical which is unsubstituted or substituted by alkyl(C$_1$-C$_6$) groups or chlorine atoms, A is a grouping of the formula —SO$_2$—NH—(CH$_2$)$_x$— or —CO—NH—(CH$_2$)$_x$—, in which x is a number from 1 to 22, and Y is the group —NR$^{13}$R$^{14}$, in which R$^{13}$ and R$^{14}$ are alkyl groups of 1 to 6 carbon atoms, and n is a number from 1 to 4.

6. A quinacridone having selectively adjusted triboelectric effects as claimed in claim 1, wherein Q, in the general formula (I) mentioned there, is a quinacridone radical which is unsubstituted or substituted by alkyl(C$_1$-C$_6$) groups or chlorine atoms, A is the group —CH$_2$—, Y is a five- six- or seven-membered nitrogen-containing heterocycle, and n is a number from 1 to 4.

7. A quinacridone having selectively adjusted triboelectric effects as claimed in claim 1, which quinacridone contains a triboelectrically active compound of the formula

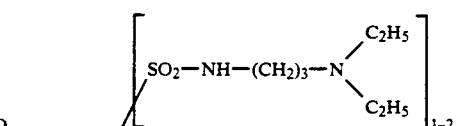
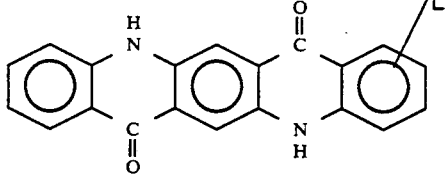

Additive 1

8. A quinacridone having selectively adjusted triboelectric effects as claimed in claim 1, which quinacridone contains a triboelectrically active compound of the formula

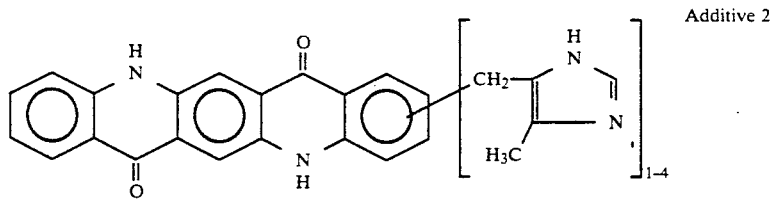

Additive 2

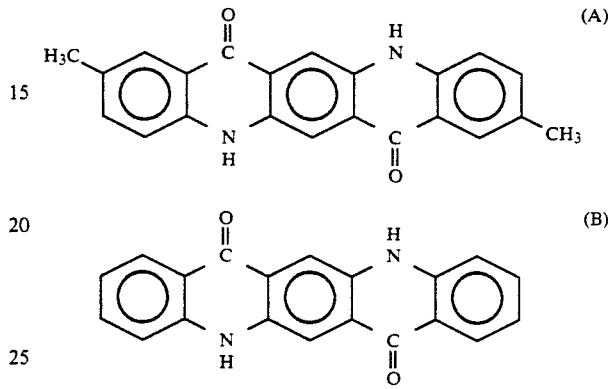

9. A quinacridone having selectively adjusted triboelectric effects as claimed in claim 1, said quinacridone containing at least about 0.05% of said triboelectrically active compound of said general formula I and a quinacridone pigment based on C.I. Pigment Red 122 or C.I. Pigment Red 209 or C.I. Pigment Violet 19 or a quinacridone mixed crystal.

10. A quinacridone pigment having selectively adjusted triboelectric effects as claimed in claim 1, said quinacridone containing at least about 0.05% of said triboelectrically active compound of said general formula I and a quinacridone mixed crystal consisting essentially of 95 to 60 parts of the quinacridone of the formula A below and 5 to 40 parts of the quinacridone of formula B below:

11. A process for the preparation of a quinacridone pigment having selectively adjusted triboelectric effects as claimed in claim 1, wherein a triboelectrically active compound of the general formula (I) mentioned in claim 1 is added to the pigment presscake of pigment powder in any desired step of the pigment synthesis or the pigment aftertreatment.

* * * * *

UNITED STATES PATENT AND TRADEMARK OFFICE
CERTIFICATE OF CORRECTION

PATENT NO. : 5,137,576
DATED : August 11, 1992
INVENTOR(S) : Gabs-Tobias Macholdt, et. al.

It is certified that error appears in the above-indentified patent and that said Letters Patent is hereby corrected as shown below:

In claim 2, column 11, line 33: "alkyl($C_1$-$C_5$)" should read --alkyl($C_1$-$C_6$)--.

In claim 3, column 12, line 15: "$R^5$" should be --$R^6$--.

In the Abstract, at line 24, "optionally" should read --optically--.

Signed and Sealed this

Nineteenth Day of October, 1993

Attest:

BRUCE LEHMAN

Attesting Officer

Commissioner of Patents and Trademarks